United States Patent

[11] 3,542,426

[72] Inventor  Donald G. Radke
              Troy, Michigan
[21] Appl. No. 765,768
[22] Filed     Oct. 8, 1968
[45] Patented  Nov. 24, 1970
[73] Assignee  Jim Robbins Seat Belt Co.
              Troy, Michigan

[54] SHOULDER HARNESS CONNECTOR
     4 Claims, 3 Drawing Figs.
[52] U.S. Cl. .................................................. 297/389,
                                                                24/224
[51] Int. Cl. ............................................... A62b 35/00
[50] Field of Search .......................................... 297/384,
              385, 389, 388; 280/150S.B.; 24/224, 222, 201.1,
                                                                   245

[56]                  References Cited
                UNITED STATES PATENTS
2,072,559   3/1937  Jacobs ............................   24/245
2,093,231   9/1937  Broadwell ......................   24/245
2,463,068   3/1949  Tilly ..............................   24/245
2,898,976   8/1959  Barecki ........................   280/150S.B.
3,271,059   9/1966  Pearson ........................   24/224
3,369,842   2/1968  Adams et al. .................   297/389

Primary Examiner—James T. McCall
Attorney—Hauke, Krass, Gifford and Patalidis

ABSTRACT: A safety seatbelt system is disclosed having a quick disconnect coupling for connecting a shoulder belt to a pair of lap belts. The coupling includes a post fixedly mounted on a tongue carried on one of the lap belts that is engagable with a buckle on the other lap belt. The post has an enlarged head and a neck with a resilient collar between the head and the tongue. The shoulder belt carries a plate on its free end with a slot connecting a pair of openings. One opening has a diameter larger than the head and the other opening has a diameter smaller than the head and the with the sides of the slot being spaced a distance greater than the diameter of the neck but less than the collar. The shoulder belt is connected to the lap belts by passing the post through the large opening so the neck and the plate are on opposite sides of the tongue and then moving the neck through the slot toward the small opening. The collar is compressed as the neck is moved through the slot so that it restrains the return motion of the post from the smaller opening, except by an intentional effort applied by the user.

Patented Nov. 24, 1970 3,542,426
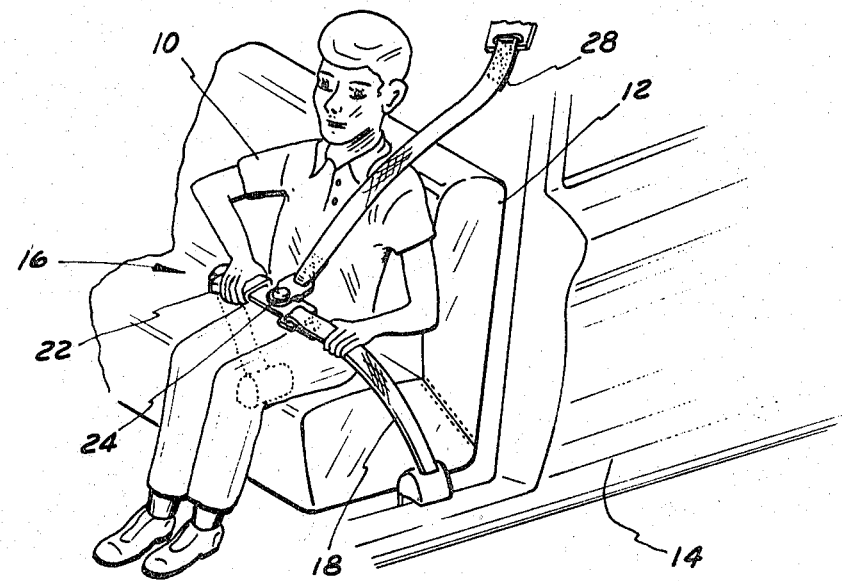
FIG·1
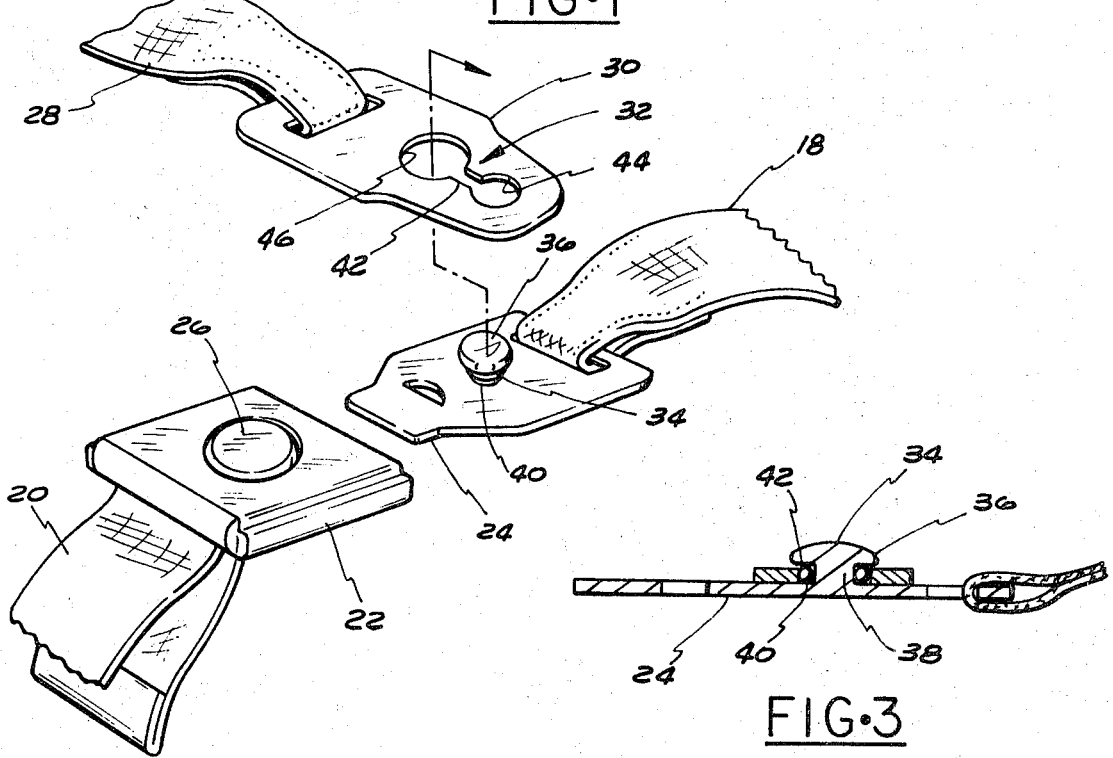
FIG·2   FIG·3
INVENTOR
DONALD G. RADKE
BY
Hauke Krass Gifford & Patalidis
ATTORNEYS

SHOULDER HARNESS CONNECTOR

BACKGROUND OF THE INVENTION

This invention relates to safety seatbelt systems and more specifically to a quick, disconnect coupling for joining the shoulder belt of such a system to a lap belt.

One problem associated with vehicle seat belt systems incorporating a shoulder belt that connects with a pair of lap belts relates to the provision of a suitable coupling that allows the user to quickly connect or disconnect the shoulder belt with respect to the lap belts, allows the shoulder belt to freely orient itself at a suitable angular disposition with respect to the lap belts in order to accommodate the physical dimensions of different users that may employ the belts as a restraining device, and also insures that the user cannot form a restraint with the shoulder belt unless both lap belts are joined together.

SUMMARY

The preferred embodiment of the present invention comprises a vehicle seatbelt system having a pair of lap belts and a shoulder belt. A conventional buckle carried on one lap belt is engagable with a tongue on the end of the second lap belt so that the two lap belts can be joined together to form a pelvic restraint. The shoulder belt is joined to the lap belts by a coupling that makes a connection with the tongue.

The lower end of each lap belt is connected to the floor on opposite sides of the seat assembly of a vehicle with the shoulder belt being mounted so that it passes over the shoulder of the seat's occupant from the same side of the seat as the lap belt carrying the tongue is connected. A post having an enlarged head is fixedly joined on one side of the tongue with the head being spaced from the tongue by a neck of a diameter smaller than the head. A collar of resilient material is carried about the neck between the head and the tongue.

A plate carried on the end of the shoulder belt has an elongated opening shaped into a pair of spaced circular openings connected by a slot. One of the circular openings has a diameter larger than the head so that the head can be passed through the opening. The sides of the slot are spaced a distance that is greater than the diameter of the neck but less than the diameter of the collar, and the second circular opening has a diameter that is less than the head but greater than the collar so that the head cannot be passed through the second opening between positions on opposite sides of the plate.

To join the plate to the tongue, the post is inserted through the large circular opening to a position in which the head and the tongue are on opposite sides of the plate and then the two plates move parallel to one another so that the neck and the collar are moved through the slot to the smaller circular opening which forms a socket for the post. When the post is disposed in its socket, the plate can be freely rotated with respect to the tongue because the collar is smaller than the socket. Thus the shoulder belt can orient itself to an angle with respect to the lap belt that accommodates the user contained within the seatbelt system. Because the collar has a diameter greater than the distance between the sides of the slot, the post cannot be unintentionally moved out of its socket because of the interference between the collar and the sides of the slot. In order to move the post through the slot to a position in which the plate can be separated from the tongue, the user must apply a deliberate effort that will compress the collar sufficiently that it and the neck can pass through the slot.

Thus the preferred coupling comprises a relatively few components arranged in such a manner that they allow the user to quickly connect or disconnect the shoulder belt to the lap belt. Since the shoulder belt and the lap to which it connects are both on the same side of the seat assembly, the user will not be tempted to form a partial restraint by joining the shoulder belt to one lap belt without also connecting the two lap belts. This is because the shoulder belt cannot be joined to the lap belt connected to the opposite side of the seat, and if connected to the lap belt from the same side of the seat only one shoulder can be encircled.

Still further objects and advantages of the present invention will readily become apparent to one skilled in the art to which the invention pertains upon reference to the following detailed description.

DESCRIPTION OF THE DRAWINGS

The description refers to the accompanying drawing in which like reference characters refer to like parts throughout the several views and in which:

FIG. 1 is a perspective view of a passenger in the passenger compartment of a vehicle contained within a seatbelt system having a shoulder belt coupled to a pair of lap belts by a coupling embodying the invention;

FIG. 2 is an exploded view of the components of the coupling of FIG. 1; and

FIG. 3 is a sectional view through the plate and the tongue showing the manner in which the collar engages the sides of the slot.

DESCRIPTION OF THE PREFERRED EMBODIMENT

Referring to the drawings, FIG. 1 shows a passenger 10 seated in a seat assembly 12 mounted in the passenger compartment of a vehicle 14. The passenger 10 is illustrated as being contained within a seatbelt restraining system generally indicated at 16 which includes a pair of lap belt sections 18 and 20. The lower ends of the two lap belt sections 18 and 20 are anchored to the vehicle 14 on opposite sides of the seat assembly 12 in the usual manner. A conventional buckle mechanism 22 carried at the upper end of the lap belt section 20 has an internal locking mechanism (not shown) for engaging an apertured tongue 24. The tongue 24 is formed of a section of plate and is carried at the upper end of the lap belt section 18. When the tongue 24 is inserted into the buckle mechanism 22 the internal-locking components engage the tongue to form a connection between the lap belt sections 18 and 20. A pushbutton 26 carried on the buckle mechanism 22 provides means for releasing the tongue 24 so that the two lap belt sections can be separated from one another.

The seatbelt system 16 also has a shoulder belt 28 with an upper end connected by means (not shown) to a portion of the passenger compartment of the vehicle at a point behind the seated position of the passenger 10 on the same side of the seat assembly 12 as the lap belt section 18.

A plate 30 is carried on the free end of the shoulder belt 28 and has an elongated opening, generally indicated at 32, for receiving a post 34 that is fixedly mounted on the tongue 24. The post 34 has an enlarged head 36 and a neck 38 which supports the head 36 above the tongue 24. The head 34 is illustrated as having a circular configuration, however, it could take other geometrical shapes. An annular collar 40 formed of a resilient material is carried about the neck 38 between the head 36 and the tongue 24.

The elongated opening 32 in the plate 30 preferably includes a slot 42 connecting a circular opening 44 and a circular opening 46 that is formed between the opening 44 and the connection between the plate 30 and the shoulder belt 28. The opening 46 is larger than the head 36 of the post so that the head can be passed through the opening 46 from a position on one side of the plate to a position on the other side so that the head 36 and the tongue 24 are on opposite sides of the plate 30.

The sides of the slot 42 are spaced a distance that is greater than the diameter of the neck 38 but less than the diameter of the collar 40 so that the neck and the collar can be passed from the opening 46 to the opening 44 through the slot by an effort in which the sides of the slot 42 compress the collar.

The opening 44 has a diameter that is smaller than the diameter of the head 36 but greater than the diameter of the neck 38 as well as the collar 40 so that the head 36 cannot pass through the opening 44 from one side of the plate 30 to the other. Thus the opening 44 forms a socket for the post 34.

In order for the passenger 10 to couple the shoulder belt 28 to the lap belt 18, he passes the post 36 through the opening 46 so that the head 36 and the tongue 24 are on opposite sides of the plate 30 and then moves the neck through the slot 42 toward the opening 44 to a position in which the neck and the collar are within the opening 44.

As the neck and the collar pass through the slot 42, the collar, which may be of rubber or other suitable resilient material, is compressed by the sides of the slot until the neck is fully received within the opening 44 so that the collar resumes its uncompressed shape. Because the opening 44 has a diameter greater than the diameter of the collar, the post can be freely rotated about its axis within the opening 44 so that the shoulder belt can freely assume any suitable angular position with respect to the lap belt. However the post cannot be unintentionally moved from the opening 44 because the collar interferes with any tendency of the neck to reenter the slot except by an intentional effort applied by the passenger 10. To separate the shoulder belt 28 from the lap belt 18, the passenger moves the post from the opening 44 through the slot 42 to the opening 46 by applying an effort that compresses the collar between the sides of the slot sufficiently to allow the neck 30 to be moved through the slot.

Thus it can be seen that I have described in detail a novel coupling for a seatbelt system having both lap and shoulder belts and which is composed of a relatively few components and which in the event of a collision provides a nonyielding connection between the shoulder belt and the lap belt. In addition, by mounting the post 36 on the tongue 24, the tongue 24 can readily cooperate with the buckle mechanism to provide a connection between the lap belt sections 18 and 20 and can cooperate with the plate 30 to provide a connection with the shoulder belt 28.

Although I have described but one embodiment of my invention, it is to be understood that various changes and revisions can be made therein without departing from the spirit of the invention as expressed in the scope of the appended claims.

I claim:

1. A seatbelt assembly comprising: a buckle mechanism adapted to be connected to a first seatbelt; a tongue engageable with said buckle mechanism and adapted to be connected to a second seatbelt whereby the first and second seatbelts may be connected together; a post extending from said tongue, said post having a neck and a head, one end of said neck being joined to said tongue and the other end supporting said head; resilient material disposed on said neck between said tongue and said head; a member adapted to be connected to a shoulder belt and including a plate portion, said plate portion having a thickness less than the length of said neck between said head and said tongue, said plate portion having first and second spaced openings therein and a slot interconnecting said openings, said first opening being large enough to pass said head therethrough, said second opening being smaller than said head to prevent said head from passing therethrough, said slot being narrower than the normal expanded dimension of said resilient material for compressing said resilient material upon relative movement between said tongue and said plate portion in moving said neck along said slot.

2. An assembly as set forth in claim 1 wherein said first and second openings are generally circular and said head is circular, said first opening having a diameter larger than the diameter of said head and said second opening having a diameter smaller than the diameter of said head.

3. An assembly as set forth in claim 1 wherein said resilient material forms a collar about said neck, said collar being independent of said neck and retained thereon by said head and said tongue.

4. An assembly as set forth in claim 3 wherein said neck is made of metal and said collar is plastic.